United States Patent
Choi et al.

(10) Patent No.: US 10,203,123 B2
(45) Date of Patent: Feb. 12, 2019

(54) HUMIDIFICATION AND AIR CLEANING APPARATUS

(71) Applicant: LG ELECTRONICS INC., Seoul (KR)

(72) Inventors: Jieun Choi, Seoul (KR); Hojung Kim, Seoul (KR); Yongmin Kim, Seoul (KR); Taeyoon Kim, Seoul (KR); Kunyoung Lee, Seoul (KR); Sanghyuk Son, Seoul (KR); Jongsu Lee, Seoul (KR); Kyoungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 15/338,163

(22) Filed: Oct. 28, 2016

(65) Prior Publication Data

US 2017/0122597 A1 May 4, 2017

Related U.S. Application Data

(60) Provisional application No. 62/248,463, filed on Oct. 30, 2015, provisional application No. 62/355,118, filed on Jun. 27, 2016.

(30) Foreign Application Priority Data

| Nov. 7, 2015 | (KR) | 10-2015-0156254 |
| Mar. 28, 2016 | (KR) | 10-2016-0037235 |
| Jun. 30, 2016 | (KR) | 10-2016-0083081 |

(51) Int. Cl.
*F24F 3/00* (2006.01)
*B01F 3/04* (2006.01)
(Continued)

(52) U.S. Cl.
CPC .............. *F24F 6/04* (2013.01); *B01D 46/10* (2013.01); *B01F 3/04021* (2013.01);
(Continued)

(58) Field of Classification Search
CPC ....... F24F 3/14; F24F 3/16; B01F 3/04; B01F 3/04085; B01F 3/04021
(Continued)

(56) References Cited

U.S. PATENT DOCUMENTS 6,248,155 B1 * 6/2001 Seaman ............... F24F 6/043
95/211

FOREIGN PATENT DOCUMENTS

| CN | 101846372 A | 9/2010 |
| CN | 104390302 A | 3/2015 |
(Continued)

*Primary Examiner* — Robert A Hopkins
(74) *Attorney, Agent, or Firm* — Dentons US LLP

(57) ABSTRACT

Provided is a humidification and air cleaning apparatus. The humidification and air cleaning apparatus includes an intake flow passage suctioning external air, a discharge flow passage discharging internal air, a blower unit flowing air flowing to the intake flow passage to the discharge flow passage, a discharge humidification medium disposed on the discharge flow passage to additionally humidify flowing air, a water tank humidification medium disposed between the blower unit and the discharge humidification medium to humidify flowing air, and a watering unit spraying water between the water tank humidification medium and the discharge humidification medium.

17 Claims, 15 Drawing Sheets

(51) Int. Cl.
*F24F 6/04* (2006.01)
*F24F 3/14* (2006.01)
*F24F 3/16* (2006.01)
*B01D 46/10* (2006.01)
*F24F 13/20* (2006.01)
*F24F 13/28* (2006.01)
*F24F 6/00* (2006.01)

(52) U.S. Cl.
CPC ............ *B01F 3/04085* (2013.01); *F24F 3/14* (2013.01); *F24F 3/16* (2013.01); *F24F 3/1603* (2013.01); *F24F 13/20* (2013.01); *F24F 13/28* (2013.01); *B01D 2279/50* (2013.01); *F24F 2003/1617* (2013.01); *F24F 2006/008* (2013.01); *F24F 2006/046* (2013.01); *Y02A 50/21* (2018.01)

(58) Field of Classification Search
USPC ........................................................ 261/72.1
See application file for complete search history.

(56) References Cited

FOREIGN PATENT DOCUMENTS

| | | |
|---|---|---|
| DE | 1501278 A1 | 12/1969 |
| JP | 2012-88050 A | 5/2012 |
| JP | 2012-207863 A | 10/2012 |

\* cited by examiner

HUMIDIFICATION AND AIR CLEANING APPARATUS

CROSS-REFERENCE TO RELATED APPLICATIONS

This U.S. non-provisional patent application claims priority under 35 U.S.C. § 119 of U.S. Provisional Application No. 62/248,463, filed on Oct. 30, 2015, Korean Patent Application No. 10-2015-0156254, filed on Nov. 7, 2015, Korean Patent Application No. 10-2016-0037235, filed on Mar. 28, 2016, U.S. Provisional Application No. 62/355,118, filed on Jun. 27, 2016, and Korean Patent Application No. 10-2016-0083081, filed on Jun. 30, 2016, the entire contents of which are hereby incorporated by reference.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges it into air and a natural evaporation type that evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter. However, since the main function of a typical humidifier is a humidification function, its air cleaning function is weak.

Also, since a typical humidifier has a structure in which the humidification process is performed by adding a filtration function, a typical humidifier cannot be operated only for air filtration.

Accordingly, even in a situation where humidity is high, a typical humidifier inevitably performs humidification even thought a user desires air cleaning.

SUMMARY OF THE INVENTION

The present invention provides a humidification and air cleaning apparatus which can separately operate a humidification function and an air cleaning function.

The present invention also provides a humidification and air cleaning apparatus which can allow a user to intuitively check with his/her eyes whether humidification is performed.

The present invention also provides a humidification and air cleaning apparatus for improving a humidification performance by using two types of humidification filters and reducing noise.

The present invention also provides a humidification and air cleaning apparatus for improving a humidification performance as a discharge humidification medium installed on a discharge flow passage uses a filter with a less water splashing phenomenon and a less pressure loss and a water tank humidification medium installed at a humidification flow passage inlet uses a filter with a high moisture absorption power.

The objectives of the present invention are not limited to the above-mentioned objectives, and other objectives that are not mentioned will be clearly understood by persons skilled in the art from the following description.

Embodiments of the present invention provide humidification and air cleaning apparatuses including: an intake flow passage suctioning external air; a discharge flow passage discharging internal air; a blower unit flowing air flowing to the intake flow passage to the discharge flow passage; a discharge humidification medium disposed on the discharge flow passage to additionally humidify flowing air; a water tank humidification medium disposed between the blower unit and the discharge humidification medium to humidify flowing air; and a watering unit spraying water between the water tank humidification medium and the discharge humidification medium.

In some embodiments, the discharge humidification medium may be formed of a material having a lower pressure loss than the water tank humidification medium.

In some embodiments, the water tank humidification medium may be formed of a material having a higher moisture absorption power than the discharge humidification medium.

In some embodiments, the water tank humidification medium may be formed of a polyethylene terephthalate (PET) material.

In some embodiments, the water tank humidification medium may include: a pre-filter preventing water sprayed by the watering unit from splashing; and a humidification filter increasing moisture in flowing air.

In some embodiments, the humidification filter may have a double raschel structure where a connection member of a PET material is disposed inside and a PET material of a hexagonal mesh structure surrounds both sides of the connection member.

In some embodiments, the pre-filter may be formed of a mesh member having a plurality of holes, and a size of a hole formed at a mesh of the pre-filter may be formed smaller than a size of a hole formed at the PET material of the hexagonal mesh structure.

In some embodiments, the pre-filter and the humidification filter may be coupled through melting.

In some embodiments, the water tank humidification medium may be formed in a hopper form that a lower section is small and an upper section is large.

In some embodiments, the humidification and air cleaning apparatuses may further include a water tank humidification medium housing supporting the water tank humidification medium, wherein the water tank humidification medium may include a fixing part to be fixed to the water tank humidification medium housing.

In some embodiments, the discharge humidification medium may be formed of a polyurethane material.

In some embodiments, the discharge humidification medium may have a pore size of 20 to 25 Pore Per Inch (PPI).

In other embodiments of the present invention, humidification and air cleaning apparatuses include: an intake flow passage disposed at a lower side and suctioning external air; a filtering flow passage filtering air flowing to the intake flow passage; a connection flow passage pressurizing air passing through the filtering flow passage to a blower unit; a humidification flow passage supplying moisture to air passing through the connection flow passage; and a discharge flow passage discharging air passing through the humidification flow passage to the outside, wherein the humidification flow passage includes: a water tank humidification medium supplying moisture to flowing air at an inlet of the humidification flow passage; a discharge humidification medium supplying moisture to flowing air at an outlet of the humidification flow passage; and a watering unit supplying water stored in a water tank as moisture to the water tank humidification medium and the discharge humidification medium.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
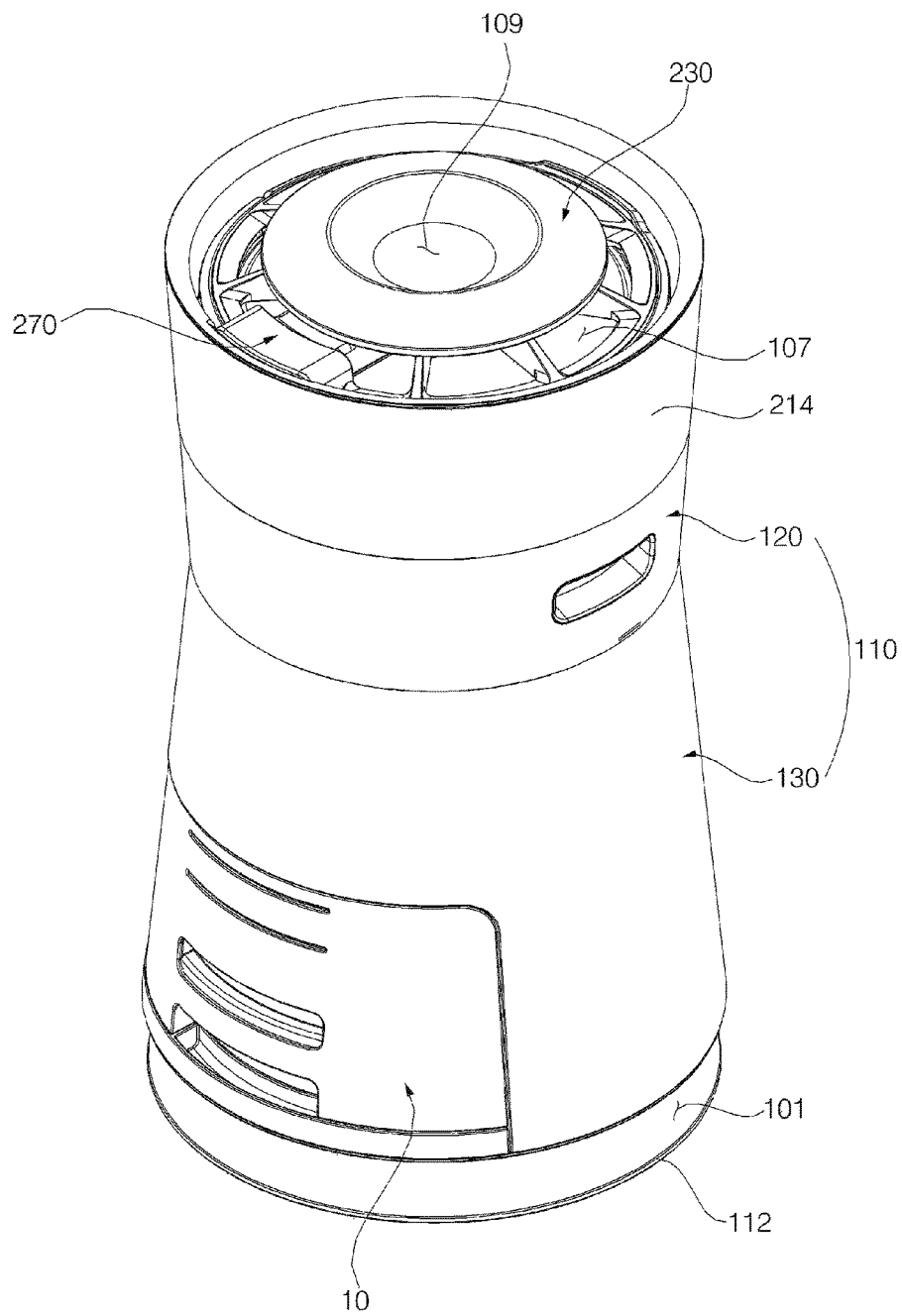
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
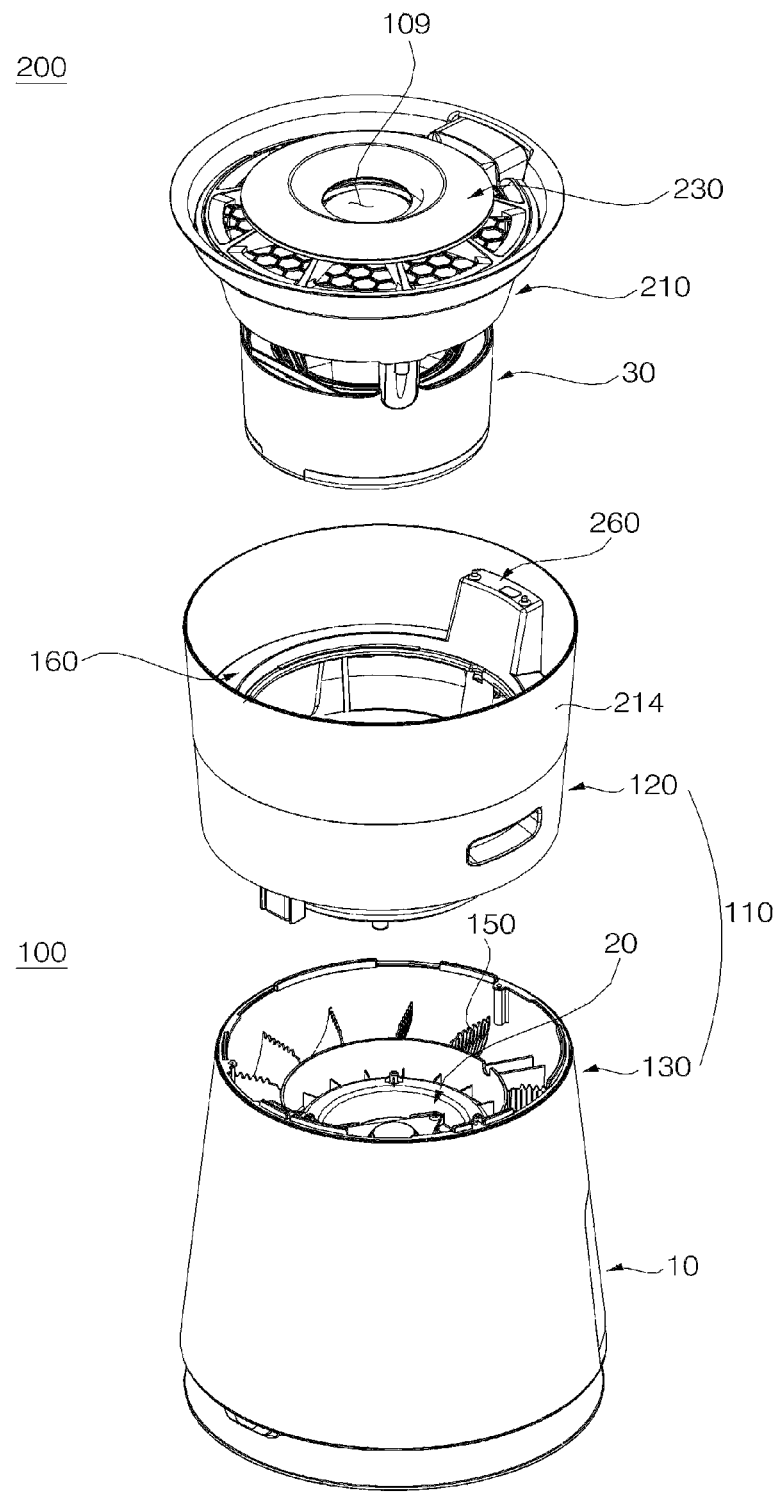
FIG. 2 is an exploded perspective view of FIG. 1.
Figure 3:
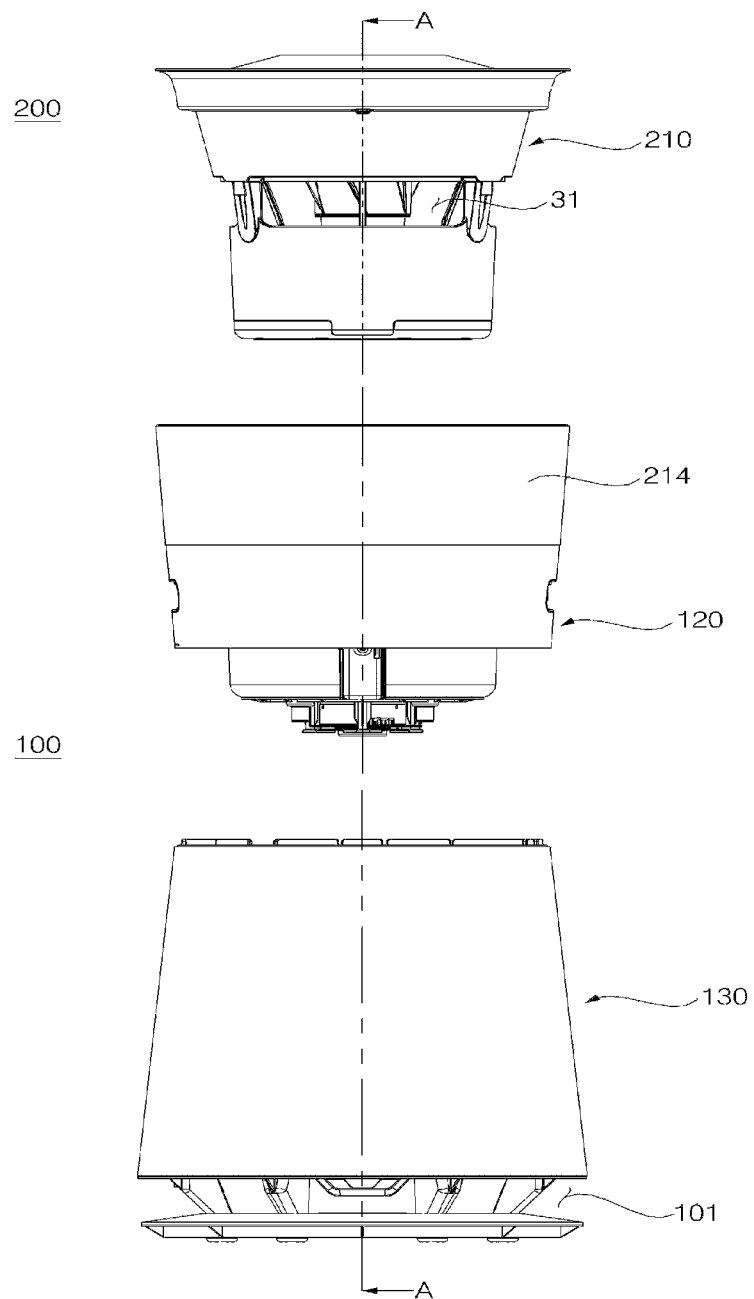
FIG. 3 is an exploded front view of FIG. 1.
Figure 4:
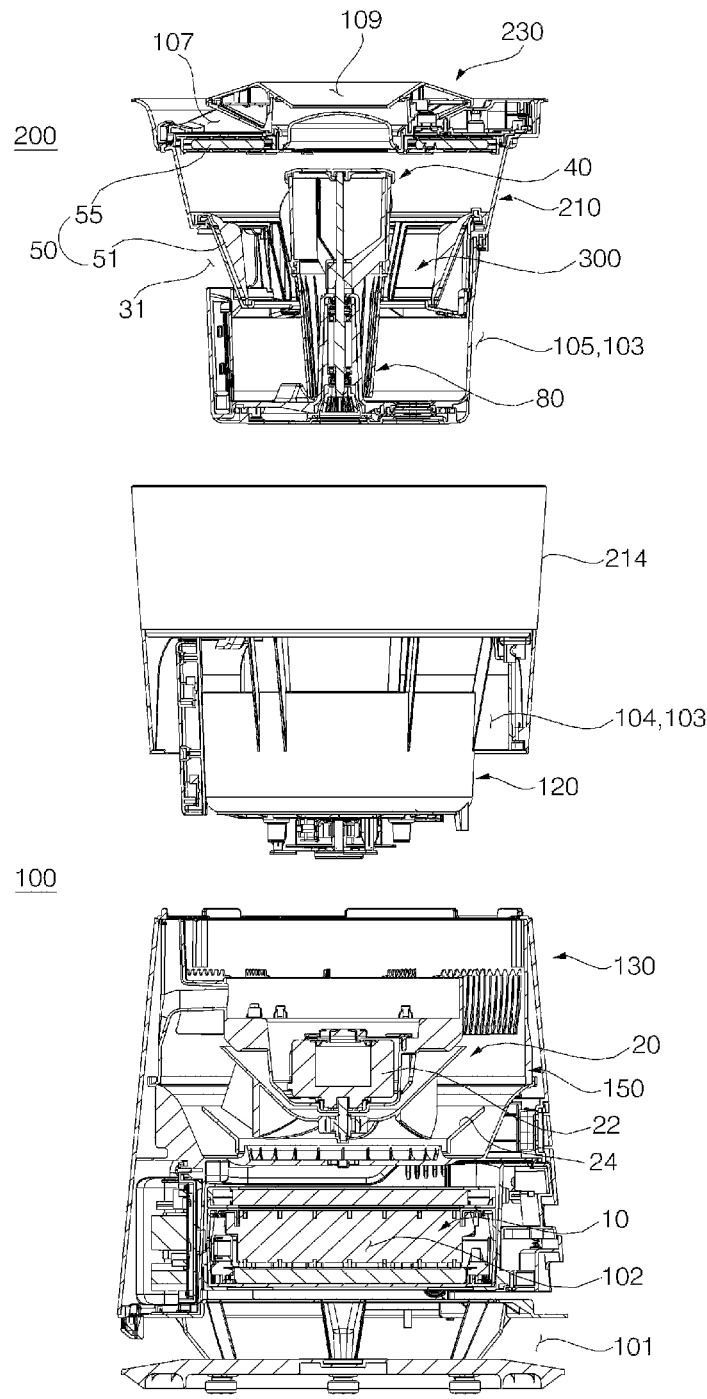
FIG. 4 is an exploded cross-sectional view of FIG. 3.
Figure 5:
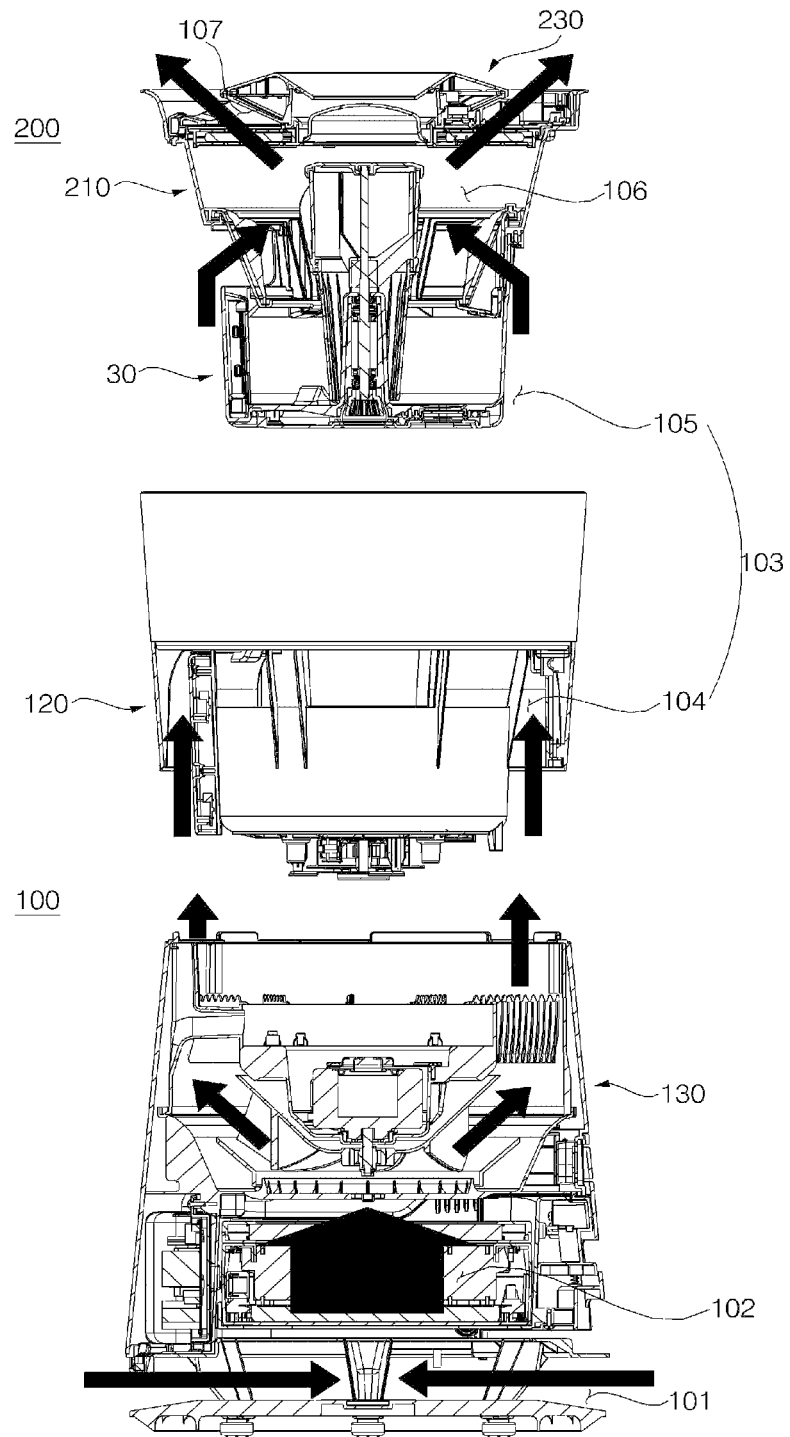
FIG. 5 is a view illustrating an air flow of the humidification and air cleaning apparatus according to the first embodiment of the present invention.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG. 5 is a perspective view when seen from the lower side of FIG. 2.

A humidification and air cleaning apparatus according to an embodiment of the present invention may include a clean module 100 and a humidification module 200 disposed over the clean module 100.

The clean module 100 may take in and filter external air, and may provide filtered air to the humidification module 200. The humidification module 200 may be supplied with filtered air, may perform humidification to provide moisture, and may discharge humidified air to the outside.

The humidification module 200 may include a water tank 30 for storing water. The water tank 30 may be separable from the clean module 100 when the humidification module 200 is separated. The humidification module 200 may be disposed over the air clean module 100.

A user can separate the humidification module 200 from the clean module 100, and can clean the humidification module 200 that is separated. A user may also clean the inside of the clean module 100 from which the humidification module 200 is separated. When the humidification module 200 is separated, the upper surface of the clean module 100 may be opened to a user. The clean module 100 may be cleaned after separately removing a filter assembly 10 described later.

A user may supply water into the humidification module 200. The humidification module 200 may have a water supply flow passage formed therein to supply water from the outside to the water tank 30.

The water supply flow passage may be configured to supply water into the water tank 300 at any moment. For example, even when the humidification module 200 is operating, water can be supplied through the water supply flow passage. For example, even when the humidification module 200 is coupled to the clean module 100, water can be supplied through the water supply flow passage. For example, even when the humidification module 200 is decoupled from the clean module 100, water can be supplied through the water supply flow passage.

The clean module 100 and the humidification module 200 may be connected to each other through a connection flow passage 103. Since the humidification module 200 is separable, the connection flow passage 103 may be distributedly formed at the clean module 100 and the humidification module 200.

The connection flow passage formed in the clean module 100 may be defined as a clean connection flow passage 104, and the connection flow passage formed in the humidification module 200 may be defined as a humidification connection flow passage 105. When the humidification module 200 is mounted on the clean module 100, for the first time, the connection flow passage may be connected and the flow passage of air may be configured accurately.

The flow of air passing through the clean module 100 and the humidification module 200 will be described in more detail later.

A configuration of the clean module 100 will be described in more detail as follows.

The clean module 100 may include a base body 110 where an intake flow passage 101 and a clean connection flow passage 104 are formed, a filter assembly 10 disposed detachable from the base body 110 and performing filtration on flowing air, and an air blowing unit 20 disposed inside the base body 110 and flowing air.

External air may be entered into the inside of the base body 110 through the intake flow passage 101. The air filtered in the filter assembly 10 may be provided to the humidification module 200 through the clean connection flow passage 104.

In this embodiment, the base body 110 may be configured with two parts.

The base body 110 may include the lower body 130 defining the exterior thereof and having an inlet hole 110 formed in the undersurface thereof, and the mounting body 120 defining the exterior thereof and coupled to the upper side of the lower body 130.

A display module 160 may be disposed in at least one of the clean module 100 or the humidification module 200 to display the operational state to a user. In this embodiment, the display module 160 may be disposed in the base body 110 to display the operational state of the humidification and air cleaning apparatus to a user.

The mounting body 120 and the lower body 130 may be assembled integrally. Unlike this embodiment, the mounting body 120 and the lower body 130 may be manufactured as one.

The humidification module 200 may be detachably mounted on the upper side of the mounting body 120 and support the weight of the humidification module 200.

The mounting body 120 may provide a structure where the water tank 30 is mounted stably. The mounting body 120 may have a structure where the water tank 30 of the humidification module 200 is separable. The mounting body 120 may have a concave structure for receiving the water tank 30.

The mounting body 120 may be concavely formed inside the base body 110 and the water tank 30 may be received inside the base body 110. Through this, the center of gravity of an air cleaner may be further moved to the lower side.

An air cleaner according to this embodiment may receive power through the clean module 100 and provide power to the humidification module 200 through the clean module 100. Since the humidification module 200 has a structure separable from the clean module 100, the clean module 100 and the humidification module 200 may be provided with a separable power supply structure.

Since the clean module 100 and the humidification module 200 are assembled through the mounting body 120, a connector 260 may be disposed in the mounting body 120 to provide power for the humidification module 200.

The filter assembly 10 may be assembled to be detachable from the base body 110.

The filter assembly 10 may provide the filtering flow passage 102, and may filter external air.

The filter assembly 10 may have a structure that is detachable from the base body 110 in a horizontal direction. The filter assembly 10 may be disposed so as to cross the flowing direction of air that flows upstream in a vertical direction. The filter assembly 10 may be disposed in a horizontal direction orthogonal to the flow of air flowing from the lower side to the upper side.

The filter assembly 10 may slide in a horizontal direction with respect to the base body 110.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the mounting body 120.

The blower fan 24 may be a centrifugal fan, and may blow air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may not be located on an air flow passage by the blower fan 24.

The humidification module 200 may include a water tank 30, a watering unit 40, a humidification medium 50, a visual body 210, and a top cover assembly 230. The water tank 30 may store water for humidification, and may be detachably disposed over the clean module 100. The watering unit 40 may be disposed in the water tank 30, and may spray water in the water tank 30. The humidification medium 50 may be wetted with water sprayed from the watering unit 40, and may provide moisture to flowing air. The visual body 210 may be coupled to the water tank 30, and may be formed of a transparent material. The top cover assembly 230 may be detachably disposed over the visual body 210, and may include a discharge flow passage 107 through which air is discharged and a water supply flow passage 109 through which water is supplied.

The water tank 30 may be mounted on the mounting body 120. The watering unit 40 may be disposed inside the water tank 30, and may rotate inside the water tank 30.

The watering unit 40 may draw water inside the water tank 30, upwardly pump the drawn water, and then spray the pumped water toward the outside in a radial direction. The watering unit 40 may include the waterwheel housing 80 that draws water, upwardly pumps drawn water, and then sprays pumped water toward the outside in a radiation direction.

Water sprayed from the waterwheel housing 80 may wet the humidification medium 50. Water sprayed from the waterwheel housing 80 may be sprayed toward at least one of the visual body 210 and the humidification medium 50.

In this embodiment, the waterwheel housing 80 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

The visual body 210 may be coupled to the water tank 30, and may be located over the water tank 30. At least a portion of visual body 210 may be formed of a material through which a user can see the inside.

The droplet formed at the inner side surface of the visual body 210 may implement a raindrop shape. The droplet flowing down from the visual body 210 may wet the humidification medium 50.

A display module 160 may be disposed outside the visual body 210. The display module 160 may be coupled to any one of the visual body 210 and the mounting body 120. In this embodiment, the display module 160 may be disposed at the mounting body 120.

When the humidification module 200 is placed, the outer surface of the visual body 210 may adhere closely to the display module 160. At least a portion of the surface of the display module 160 may be formed of a material that reflects light.

Droplets formed on the visual body 210 may also be projected onto the surface of the display module 160. Accordingly, a user can observe the motion of droplets at both visual body 210 and display module 160.

The water tank 30 may include a water tank inlet 31 through which air passes. The air supplied from the clean module 100 may flow into the humidification module 200 through the water tank inlet 31.

The humidification medium 50 may include a water tank humidification medium 51 disposed at the connection flow passage 103, and a discharge humidification medium 55 disposed at the discharge flow passage 107.

The water tank humidification medium 51 may be disposed on the connection flow passage 103 and in this embodiment, may be disposed at the water tank inlet 31 of the water tank 30. The water tank humidification medium 51 may be disposed inside the water tank inlet 31 and provide humidification on air passing through the water tank inlet 31.

The water tank humidification medium 51 may cover the water tank inlet 31, and air may penetrate the water tank humidification medium 51 to flow into the water tank 30.

The discharge humidification medium 55 may be disposed on the discharge flow passage 107. The discharge humidification medium 55 may be disposed on at least one of the visual body 21 or the top cover assembly 230. In this embodiment, the discharge humidification medium 55 may be disposed at the top cover assembly 230.

The discharge humidification medium 55 may cover the discharge flow passage 107, and air may penetrate the discharge humidification medium 55 to flow to the outside of the top cover assembly 230.

Hereinafter, the flow of air will be described with reference to the accompanying drawings.

When the air blowing unit 20 operates, external air may flow into the base body 110 through the intake flow passage 101 formed at a lower side of the base body 110. Air entered through the intake flow passage 101 may pass the clean module 100 and the humidification module 200 while moving upward, and may be discharged to the outside through the discharge flow passage 107 formed at an upper side of the humidification module 200.

The air entered to the intake flow passage 101 may pass through the filtering flow passage 102 of the filter assembly 10. As the air passes through the filtering flow passage 102, the filter assembly 10 may filter external air.

Air passing the filtering flow passage 102 may flow to the connection flow passage through the air blowing unit 20. After the air passing through the filtering flow passage 102 is pressed by the blower fan 24, it flows to the connection flow passage 103 along the blower housing 150.

Since the air blowing unit 20 is disposed next to the filtering flow passage 102, adherence of foreign substances like dust on the blower fan 24 can be minimized If the air blowing unit 20 is disposed before the filtering flow passage 102, foreign substances may be attached to the blower fan 24, and due to this, a cleaning cycle may be shortened.

Also, since the air blowing unit 20 is disposed at the front of the humidification flow passage 106, adherence of moisture on the surface of the blower fan 24 can be minimized When moisture adheres to the surface of the blower fan 24, foreign substances may adhere to the surface of the blower fan 24 or molds may be likely to grow on the blower fan 24.

Since the air blowing unit 20 is disposed between the filtering flow passage 102 and the humidification flow passage 106, the adherence of foreign substances may be minimized and the flow pressure of air may be provided appropriately.

The connection flow passage 103 may include the clean connection flow passage 104 formed in the clean module 100 and the humidification connection flow passage 105 formed in the humidification module 200.

When the humidification module 200 is placed on the mounting body 120, the clean connection flow passage 104 and the humidification connection flow passage 105 may be connected to each other. When the humidification module 200 is in a separated state, the clean connection flow passage 104 and the humidification connection flow passage 105 may be exposed to the outside.

The clean connection flow passage 104 may be formed in the mounting body 120, and the humidification connection flow passage 105 may be formed in the humidification module 200.

The clean connection flow passage 104 and the humidification connection flow passage 105 may also be formed in a form of duct to form a clear flow passage. In this embodiment, when the connection flow passage 103 is distributed as a partial structure of the mounting body 120 and a partial structure of the water tank 30 and the humidification module 200 is mounted on the mounting body 120, the connection flow passage 103 may be formed.

In this embodiment, the mounting body 120 may provide the outer structure of the connection flow passage 103 and the water tank 30 may provide the inner structure of the connection flow passage 103.

That is, the connection flow passage 103 may be formed between the outside of the water tank 30 and the inside of the mounting body 120. Therefore, the connection flow passage 103 may be formed between the water tank 30 and the mounting body 120. The water tank 30 may form an inner wall of the connection flow passage 103 and the mounting body 120 may form an outer wall of the connection flow passage 103.

In such a manner, the structure of the connection flow passage 103 may minimize a structure for forming a flow passage through a distributed arrangement. The connection flow passage 103 may be formed in a vertical direction.

Air passing through the connection flow passage 103 may flow into the humidification flow passage 106. The humidification flow passage 106 may be a section where moisture is supplied. In this embodiment, the humidification flow passage 106 may be a flow passage from the water tank humidification medium 51 to the discharge humidification medium 55.

While air passes through the water tank humidification medium 51, moisture may be supplied to the air in the connection flow passage 51. Then, water drops scattered from the watering unit 40 and moistures evaporated from the water tank 30 may be provided into the water tank 30.

As air passes through the discharge humidification medium 55, moisture may be supplied again to the air in the water tank 30.

Moisture may be supplied in the humidification flow passage 106 through the water tank humidification medium 51, the inside of the water tank 30, and the discharge humidification medium 55.

Air passing through the discharge humidification medium 55 may be exposed to the outside through the discharge flow passage 107.

Figure 6:
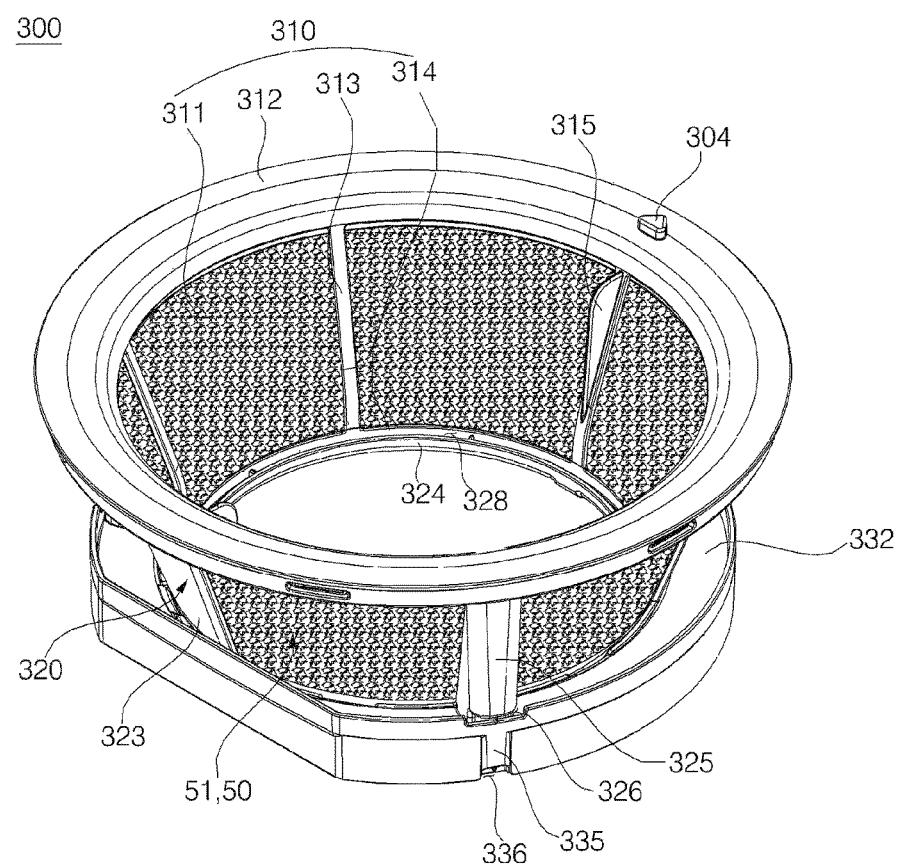
FIG. 6 is a perspective view illustrating the water tank humidification medium housing shown in FIG. 4.
Figure 7:
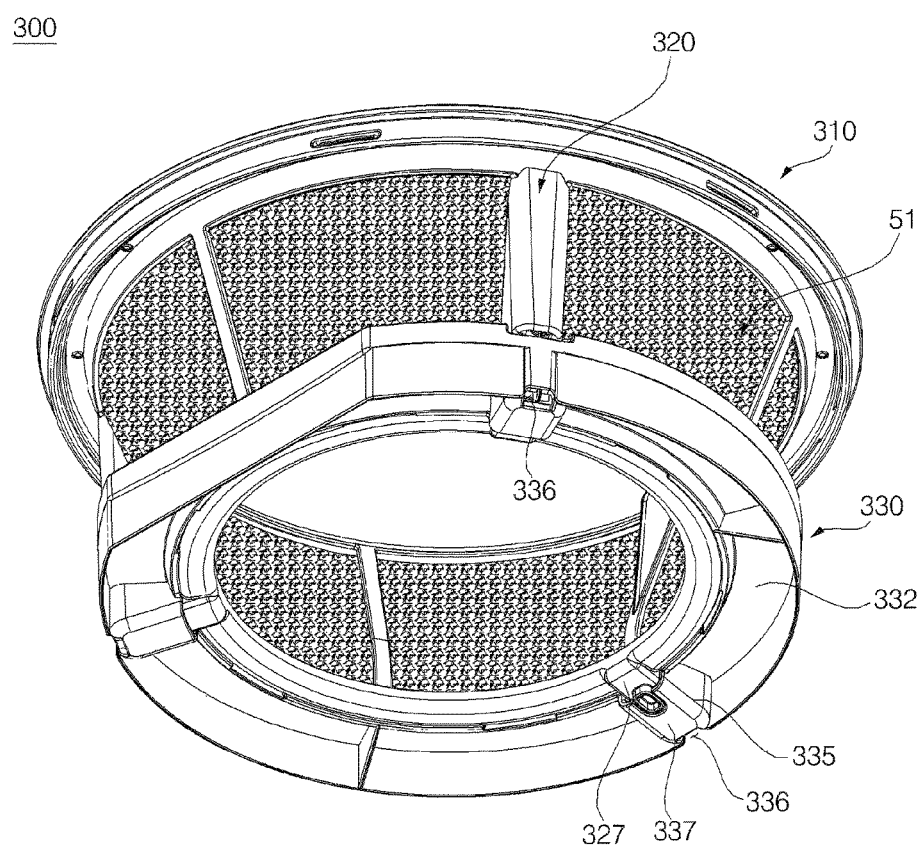
FIG. 7 is a perspective view when seen from the lower side of FIG. 6.
Figure 8:
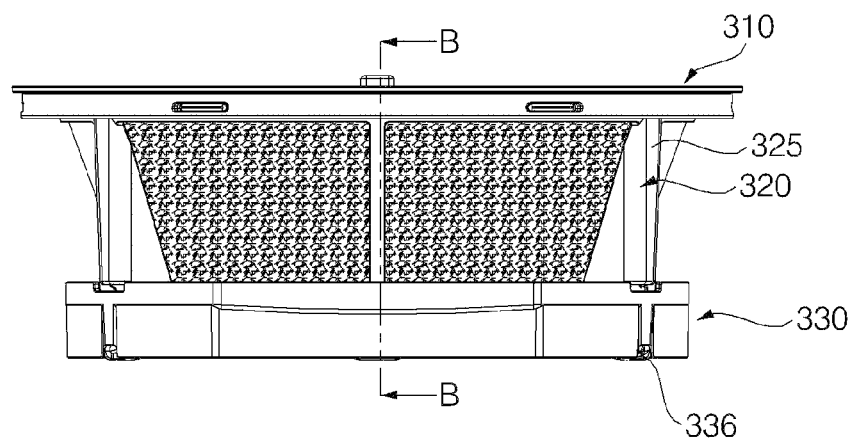
FIG. 8 is a front view of FIG. 6.
Figure 9:
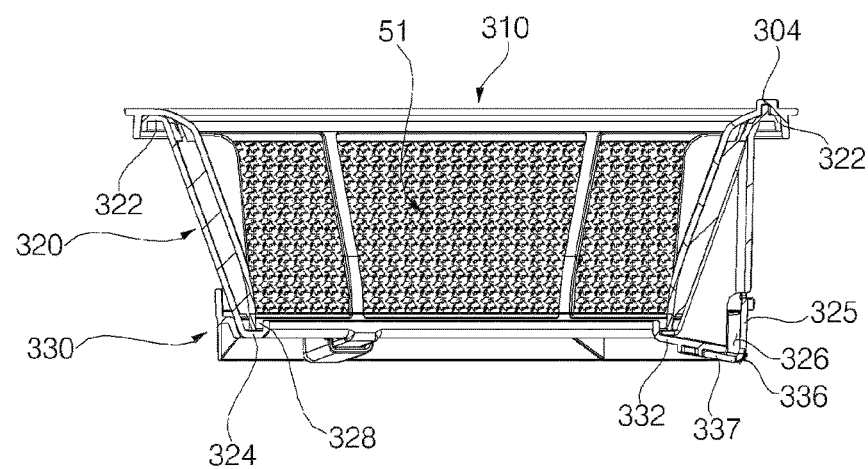
FIG. 9 is a cross-sectional view taken along line A-A of FIG. 8.
Figure 10:
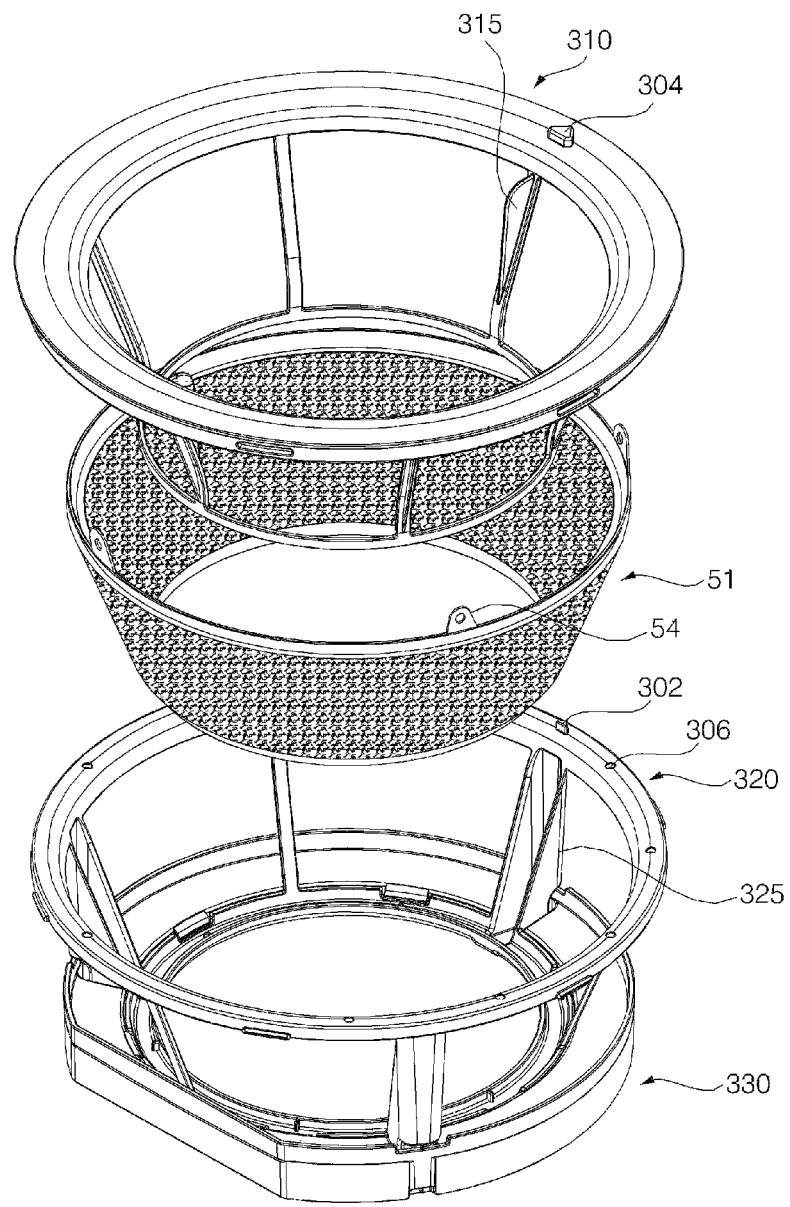
FIG. 10 is an exploded perspective view of FIG. 6.
Figure 11:
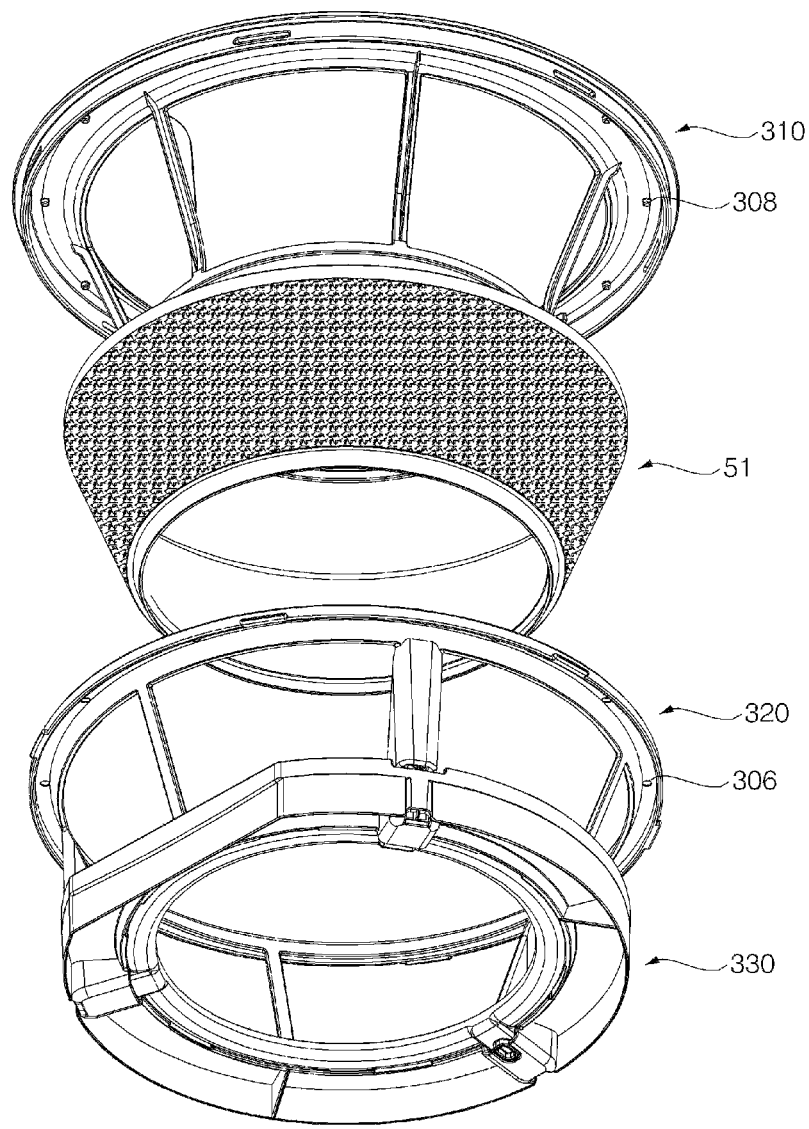
FIG. 11 is a perspective view when seen from the lower side of FIG. 10.
Figure 12:
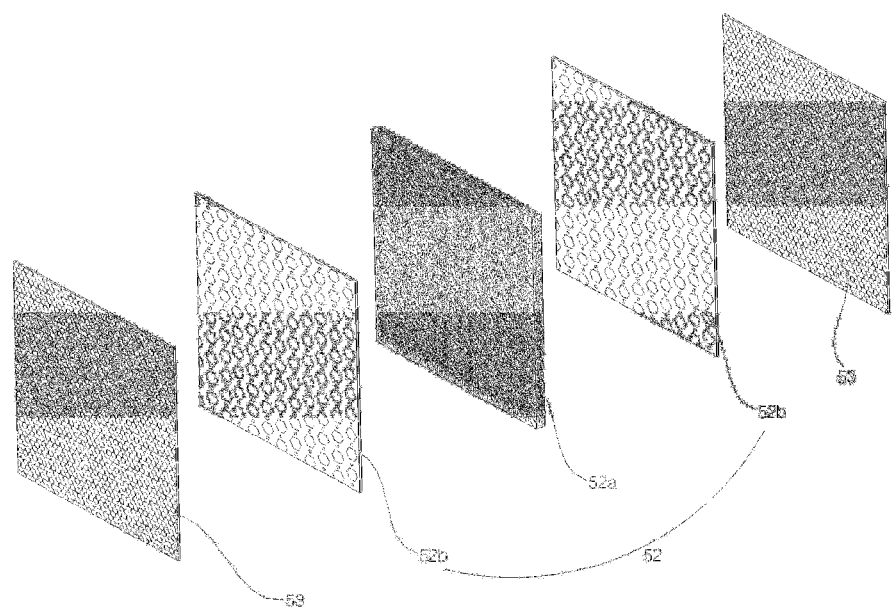
FIG. 12 is a view illustrating a water tank humidification medium according to an embodiment of the present invention.

FIG. 6 is a perspective view illustrating the water tank humidification medium housing shown in FIG. 4. FIG. 7 is a perspective view when seen from the lower side of FIG. 6. FIG. 8 is a front view of FIG. 6. FIG. 9 is a cross-sectional view taken along a line A-A of FIG. 8. FIG. 10 is an exploded perspective view of FIG. 6. FIG. 11 is a perspective view when seen from the lower side of FIG. 10. FIG. 12 is a view illustrating a water tank humidification medium according to an embodiment of the present invention.

Referring to the drawing, a water tank humidification medium and a water tank humidification medium housing will be described in more detail.

In this embodiment, a housing where the water tank humidification medium 51 in the humidification medium 50 is installed may be defined as a water tank humidification medium housing 300.

In this embodiment, the water tank humidification medium housing 300 may be disposed at the water tank 30. Especially, the water tank humidification medium housing 300 may be disposed inside the water tank inlet 31. In this embodiment, the water tank humidification medium housing 300 may be mounted on the visual body 210 and disposed inside the water tank 30. Unlike this embodiment, the water tank humidification medium housing 300 may be installed at the water tank 30.

The water tank humidification medium housing 300 may pass the air entered through the water tank inlet 31. The water tank humidification medium 51 may perform humidification on the passing air.

The water tank humidification medium housing 300 may supply moisture to flowing air as installing the water tank humidification medium 51 and also prevent water from overflowing from the water tank 30 as covering the upper side of the water tank 30.

When the water tank humidification medium housing 300 is mounted at the visual body 210, the lower end closely contacts the upper edge of the water tank 30. Unlike this embodiment, as the water tank humidification medium housing 300 is fastened or coupled to the upper end of the water tank 30, water overflowing may be prevented completely.

In this embodiment, by closely contacting a portion of the water tank humidification medium housing 300 to the water tank 30, overflowing may be prevented.

The water tank humidification medium housing 300 may include an inner medium frame 310 disposed inside the water tank humidification medium 51, supporting the water tank humidification medium 51, and including an inner medium inlet 311 where air passes, an outer medium frame 320 disposed outside the water tank humidification medium 51, supporting the water tank humidification medium 51, and including an outer medium inlet 321 where air passes, and a water overflowing prevention cover 330 coupled to at least one of the inner medium frame 310 or the outer medium frame 320 and preventing the water overflowing of the water tank 30 as closely contacting the water tank 30.

The inner medium frame 310 may include an inner upper frame 312 mounted on the visual body 210, an inner vertical frame 313 extending downwardly from the inner upper frame 312 and forming the inner medium inlet 311, and an inner lower frame 314 connected to the inner vertical frame 313 and mounted on the upper side surface of the water overflowing prevention cover 330.

A handle 315 may be formed at the inner vertical frame 313. The handle 315 may be formed in plurality.

Like the inner medium frame 310, the outer medium frame 320 may include an outer medium inlet 321, an outer upper frame 322, an outer vertical frame 323, and an outer lower frame 324.

A storage space 328 may be formed in the outer lower frame 324.

Flowing-down water may be temporarily stored in the storage space 328.

The water overflowing prevention cover 330 may include a cover part 332 for covering the upper part of the water tank 30, a barrier 334 connected to the cover part 332 and forming a housing space 338 as bent from the cover part 332, a cover insertion groove 335 formed at the cover part 332, where the outer medium guide 325 is inserted, and a cover hole 336 formed at the cover insertion groove 335 and communicating with the inside of the water tank 30 to drain water.

The undersurface of the cover insertion groove 335 may be formed as an inclination surface 337. The inclination surface 337 may correspond to the inclination surface 327 of the outer medium guide 325.

An inner medium inlet 311 where air passes may be formed at the inner medium frame 310. An outer medium inlet 321 where air passes may be formed at the outer medium frame 320.

The inner medium inlet 311 and the outer medium inlet 321 may be formed to receive air in 360-degree all directions of a circumference thereof. The inner medium inlet 311 and the outer medium inlet 321 may be disposed facing each other.

The inner medium frame 310 may be formed with a large upper diameter and a small lower diameter. The outer medium frame 320 may be also formed with a large upper diameter and a small lower diameter. In this embodiment, the water tank humidification medium housing 300 may be formed in a hopper shape as a whole.

The water tank humidification medium housing 300 may include a direction display means for displaying a position where the water tank humidification medium housing 300 is coupled. The direction display means may be formed in a manner that a display groove 304 is provided to the inner medium frame 310 and a display protrusion 302 is provided to the outer medium frame 320 and inserted. The display groove 304 and the display protrusion 302 may be coupled in a tight fitting manner, and fix the coupling of the inner medium frame 310 and the outer medium frame 320.

The outer medium frame 320 and the inner medium frame 310 may be coupled to each other in a force fitting manner When the outer medium frame 320 and the inner medium frame 310 are forcingly fitted, the water tank humidification medium 51 may be fixed.

In order to fix the water tank humidification medium 51, a humidification medium fixing means for fixing the water tank humidification medium 51 may be formed on at least one of the outer medium frame 320 or the inner medium frame 310.

In this embodiment, the humidification medium fixing means may be configured with a protrusion and a hole.

The humidification medium fixing means may include a fixing protrusion 308 formed on one of the inner medium frame 310 or the outer medium frame 320 and a fixing hole 306 formed on the other one. The fixing protrusion 308 is inserted into the fixing hole 306. In this embodiment, the number of fixing protrusions 308 and fixing holes 306 may vary in a corresponding range.

In this embodiment, the fixing protrusion 308 may be formed at the inner medium frame 310 and the fixing hole 306 may be formed at the outer medium frame 320. Unlike this embodiment, they may be disposed opposite to their locations. The fixing part 54 of the water tank humidification medium 51 may be disposed between the fixing protrusion 1302 and the fixing hole 306, and when the fixing protrusion 308 is inserted into the fixing hole 306, the water tank humidification medium 51 is fixed to the water tank humidification medium housing 300.

The fixing protrusion 308 and the fixing hole 306 may prevent the water tank humidification medium 51 from moving between the inner medium frame 310 and the outer medium frame 320.

In this embodiment, in relation to the fixing hole 306, a vertically-open hole may be formed at the outer upper frame 322 of the outer medium frame 320.

The fixing protrusion 308 may be disposed at the inner upper frame 312 of the inner medium frame 310 and may be formed protruding downwardly from the lower surface of the inner upper frame 312.

It may have an effect that the inner medium frame 310 and the outer medium frame 320 are coupled by the coupling of the fixing protrusion 308 and the fixing hole 306.

The water tank humidification medium 51 may be disposed between the inner medium frame 310 and the outer medium frame 320. The water tank humidification medium 51 may cover the water tank inlet 31. The water tank humidification medium 51 may be formed in a ring shape. In this embodiment, the water tank humidification medium 51 may be formed in a hopper shape with a small lower cross-sectional area and a large upper cross-sectional area.

The water tank humidification medium 51 may include at least one fixing part 54 for fixing the water tank humidification medium housing 300. The number of fixing parts 54 may be equal to or less than the number of fixing protrusions 308 and fixing holes 306. The fixing part 54 may have a ring shape and may be disposed at the upper side of the water tank humidification medium 51. The fixing part 54 may be fixed between the fixing protrusion 308 and the fixing hole 306. Since the fixing part 54 is fixed between the fixing protrusion 308 of the inner medium frame 310 and the fixing hole 306 of the outer medium frame 320, the water tank humidification medium 51 does not move between the inner medium frame 310 and the outer medium frame 320.

The water tank humidification medium 51 may be disposed slanted with respect to a vertical direction. The inclination of the water tank humidification medium 51 may consider an air flowing direction.

The air flowing to the water tank inlet 31 through the connection flow passage 103 may form a flow slanted in the upper direction rather than a horizontal movement. The slantly-formed water tank humidification medium 51 may be disposed orthogonal to the air flowing direction.

When the air flow is orthogonal to the water tank humidification medium 51, it may be possible to prevent the air from concentrating on a specific portion of the water tank humidification medium 51 and the air may be passed through evenly in the entire area.

The water tank humidification medium 51 may use a material having an excellent ability to absorb in order to an obtain humidification function. The water tank humidification medium 51 may be formed of a material including Polyethylene terephthalate (PET) having an excellent ability to absorb.

Referring to FIG. 12, the water tank humidification medium 51 may include a pre-filter 53 for preventing the water sprayed by the watering unit 40 from splashing and a humidification filter 52 for increasing moisture in the air flowing through the water tank humidification medium 51. The humidification filter 52 may form a double raschel structure where a connection member 52a of a PET material is disposed therein and a PET material 52b of a hexagonal mesh structure surrounds the both sides of a filling material. The double raschel structure is also known as a 3D mesh. Its upper layer and lower layer may be formed of a mesh of a rectangular or hexagonal structure and may be connected by a connection member.

Since the PET material 52b of a hexagonal mesh structure has improved moisture absorption power and humidification performance in a predetermined spaced state, by placing the connection member 52a of a PET material inside the humidification filter 52, the PET materials 52b of a hexagonal mesh structure disposed at the both sides are spaced a predetermined distance. The moisture absorption power means an object ability to absorb moisture.

The pre-filter 53 may be formed of a structure surrounding the both sides of the humidification filter 52. The pre-filter 53 may be formed of a mesh member having a plurality of holes. The size of a hole formed at the mesh of the pre-filter 53 may be formed smaller than the size of a hole formed at the PET material 52b of the hexagonal mesh structure of the humidification filter 52, so that this may prevent the water sprayed to the water tank humidification medium 51 from splashing, and also prevent the water drawn to the water tank humidification medium 51 from flowing into the connection flow passage 103.

Since the pre-filter 53 surrounds the both sides of the humidification filter 52, it may form the outer surface of the water tank humidification medium 51. Therefore, one side surface may face the humidification flow passage 106 to absorb the water sprayed from the watering unit 40 and the other side surface may face the connection flow passage 103 to prevent water from flowing to the outside of the water tank humidification medium 51.

In relation to the pre-filter 53 disposed at the surface where water is sprayed by the watering unit 40, when water hits a small-sized hole, a liquid layer may be formed at the hole by surface tension and the water remaining on such as a liquid layer may be absorbed to the humidification filter 52.

Additionally, the pre-filter 53 facing the connection flow passage 103 may form a liquid layer in order to prevent the water absorbed in the humidification filter 52 from flowing into a connection flow passage.

The water tank humidification medium 51 according to this embodiment may be formed of three types of members. As shown in FIG. 12, the water tank humidification medium 51 may be formed of a quintuple structure where the humidification filter 52 of a triple structure where the PET materials 52b of a hexagonal mesh structure surround the connection member 52a disposed inside and the pre-filters 53 surround the both sides of the humidification filter 52, thereby effectively absorbing water and preventing water from passing through the connection flow passage 103 at the same time.

The humidification filter 52 and the pre-filter 53 may be coupled to each other through welding at the upper side and the lower side. When the humidification filter 52 and the pre-filter 53 are coupled to each other through welding, fuzz occurring during the coupling by sewing may be prevented.

Figure 13:
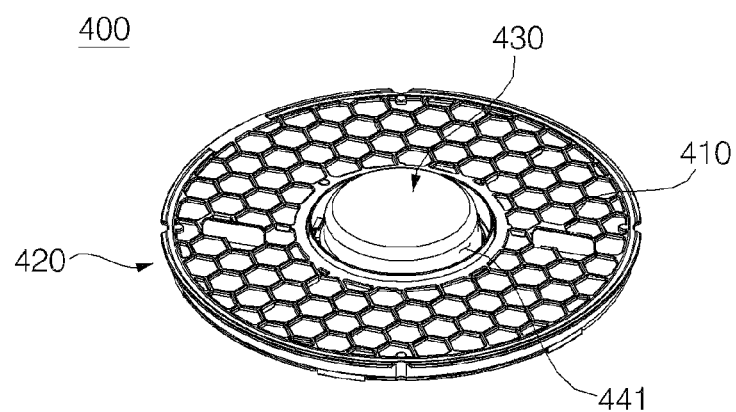
FIG. 13 is a perspective view illustrating the discharge humidification medium housing shown in FIG. 4.
Figure 14:
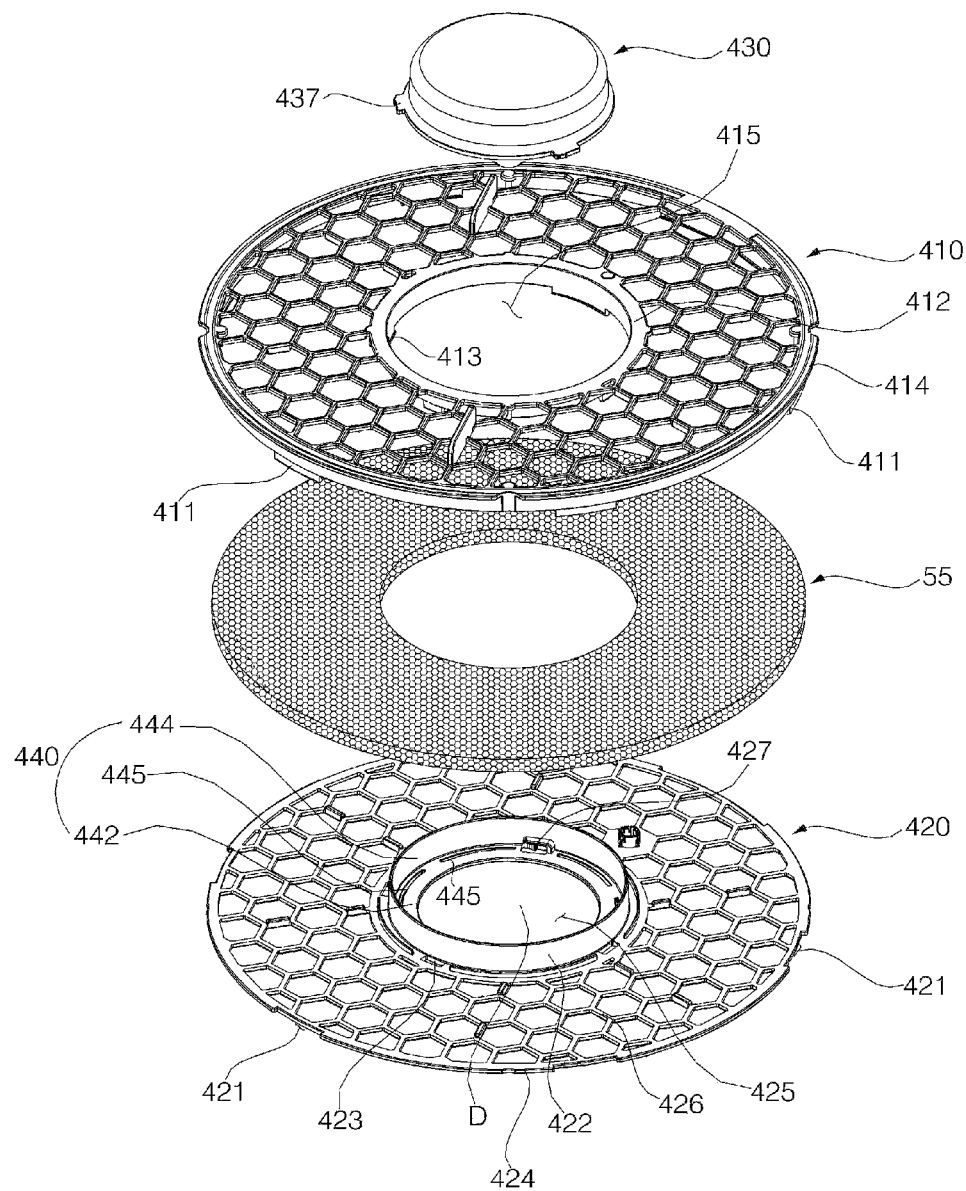
FIG. 14 is an exploded perspective view of FIG. 13.
Figure 15:
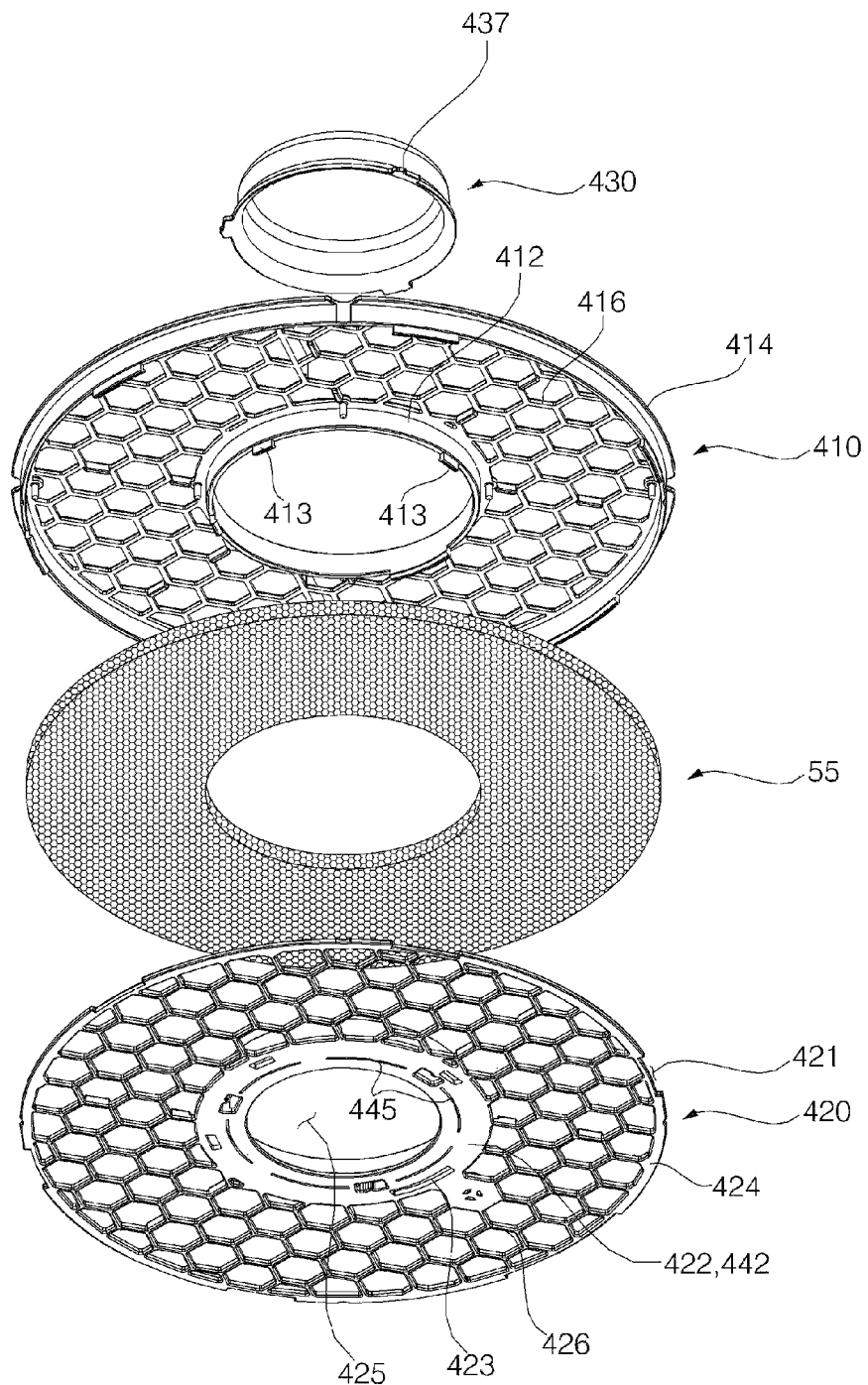
FIG. 15 is a perspective view when seen from the lower side of FIG. 14.

The water tank humidification medium 51 may use the pre-filter 53 and the humidification filter 52 of a PET material having an excellent ability to absorb in order to improve humidification performance FIG. 13 is a perspective view of the discharge humidification medium housing shown in FIG. 4. FIG. 14 is an exploded perspective view of FIG. 13. FIG. 15 is a perspective view when seen from the lower side of FIG. 14.

Referring to the drawing, a discharge humidification medium and a discharge humidification medium housing will be described in more detail.

In this embodiment, a housing in which the discharge humidification medium 55 among the humidification medium 50 is installed may be defined as a discharge humidification medium housing 400.

In this embodiment, the discharge humidification medium housing 400 may be disposed over the discharge flow passage 107. The discharge humidification medium housing 400 may be installed in the top cover assembly 230.

The discharge humidification medium housing 400 may be manufactured integrally with the top cover assembly 230. In this embodiment, the discharge humidification medium housing 400 may be manufactured separately from the top cover assembly 230. The discharge humidification medium housing 400 may be disposed under the top cover assembly 230. The discharge humidification medium housing 400 may be detachably coupled to the top cover assembly 230. In this embodiment, the discharge humidification medium housing 400 may be placed over the visual body 210.

The top cover assembly 230 may form a portion of the water supply flow passage 109, and may expose a water supply cap 430 to a user.

The discharge humidification medium housing 400 may allow air to pass the outside thereof and may allow water to pass the inside thereof. Air may pass from lower side to upper side, and water may pass from upper side to lower side.

The discharge humidification medium housing 400 may provide the discharge flow passage 107 through which air passes at the outside, and may provide the water supply flow passage 109 through which water passes at the inside.

The discharge humidification medium housing 400 may include an upper housing 410, a lower housing 420, and a water supply cap 430. The discharge humidification medium 55 may be disposed between the upper housing 410 and the lower housing 420.

The upper housing 410 and the lower housing 420 may have a plurality of air gaps formed therein.

The upper housing 410 may have a donut shape on the whole.

The upper housing 410 may include an upper inner frame 412 disposed at the center thereof, an upper housing opening 415 formed at the center of the upper inner frame 412 and providing the water supply flow passage 109, an upper outer frame 414 spaced from the upper inner frame 412 and disposed at the edge thereof, and an upper mesh frame 416 connecting the upper inner frame 412 and the upper outer frame 414.

The lower housing 420 may have a donut shape on the whole.

The lower housing 420 may include a lower inner frame 422 disposed at the center thereof, a lower housing opening 425 formed at the center of the lower inner frame 422 and providing the water supply flow passage 109, a lower outer frame 424 spaced from the lower inner frame 422 and disposed at the edge thereof, and a lower mesh frame 426 connecting the lower inner frame 422 and the lower outer frame 424.

The upper housing 410 and the lower housing 420 may have a shape corresponding to each other. The upper housing opening 415 and the lower housing opening 425 may communicate with each other.

The upper housing 410 and the lower housing 420 may be assembled with each other.

The water supply cap 430 may be coupled to at least one of the upper housing 410 and the lower housing 420. In this embodiment, the water supply cap 430 may be separately fitted into the lower housing 420.

For the detachable coupling between the water supply cap 430 and the lower housing 420, a coupling protrusion 437 and a coupling groove 427 may be formed.

The coupling protrusion 437 may be formed on any one of the water supply cap 430 and the lower housing 420, and the coupling groove 427 may be formed in the other one. In this embodiment, the coupling protrusion 437 may be formed on the water supply cap 430, and the coupling groove 427 may be formed in the lower housing 420. The coupling protrusion 427 and the coupling groove 427 may be horizontally coupled to each other by fitting coupling.

Meanwhile, a water supply structure 440 may be disposed in the discharge humidification medium housing 400 to temporarily store water to be supplied and discharge stored water to a lower side.

The water supply structure 440 may include a reservoir 441 disposed over the water supply flow passage 109 and temporarily storing water, and a water outlet 445 discharging water from the reservoir 441 to the water tank 30.

The lower housing 420 may include a reservoir base 442 and a reservoir wall 444. The reservoir base 442 and the reservoir wall 444 may be formed on the lower inner frame 422. The reservoir 441 may be formed inside the reservoir wall 444, over the reservoir base 442, and outside the water supply cap 430. When water is stored in a water supply reservoir 441, it may be drained through a water supply hole 445 by the self-load.

The discharge humidification medium 55 may be disposed between the upper housing 410 and the lower housing 420. The discharge humidification medium 55 may be formed in a ring shape as a whole. The discharge humidification medium 55 may be disposed between an upper mesh frame 416 of the upper housing 410 and a lower mesh frame 426 of the lower housing 420.

The discharge humidification medium 55 may be a filter for humidifying air before it is discharged to the outside. When the air passing through the discharge humidification medium 55 has a low pressure due to pressure loss, since humidification performance is deteriorated, it may be preferable to use a material having a lower pressure loss compared to the water tank humidification medium 51.

The pressure loss may mean a pressure drop in fluid caused by fluid friction when it flows through a pipe-shaped passage or passes through a device.

In relation to a humidification and air cleaning apparatus according to this embodiment, water supply may be implemented through the discharge humidification medium 55. Therefore, water supply may be possible during an operation of the humidification and air cleaning apparatus, and it may be preferable to use a material having a less water splashing phenomenon in order to prevent water from splashing to the outside and prevent the water sprayed by the watering unit 40 from splashing to the outside. The water splashing phenomenon means a phenomenon that water is reflected by an object and splashed when the water is sprayed to or drops on the object.

TABLE 1

|  | PRESSURE LOSS (mmAq) | WATER SPLASHING (1 min) |
|---|---|---|
| PET (HUMIDIFICATION FILTER AND PRE-FILTER) | 1.79 | 10-20 |
| polyurethane 20 PPI | 0.43 | 10 |
| 25 PPI | 1.19 | 5-10 |
| 30 PPI | 2.25 | 1-5 |

The discharge humidification medium 55 may use a polyurethane material having a lower pressure loss and a less water splashing phenomenon compared to the water tank humidification medium 51. Table 1 illustrates a pressure loss when air passes through a humidification filter at 2.33 m/s and the degree of water splashing of filters by sprayed water. As shown, when polyurethane of 20 to 25 Pore Per Inch (PPI) is compared to a filter of a PET material, since a water splashing phenomenon is equal or less but a pressure loss is reduced greatly, the polyurethane may be used as a material of the discharge humidification medium 55.

Since the discharge humidification medium 55 uses a material having a less water splashing phenomenon, even when water is supplied to the upper part of the discharge humidification medium 55 during an operation of a humidification and air cleaning apparatus according to the present invention, the water may not be splashed and may be supplied stably.

A humidification and air cleaning apparatus according to an exemplary embodiment of the present invention has at least one of the following effects.

First, humidification performance can be improved and noise can be reduced by using two types of humidification filters.

Second, as a discharge humidification medium installed on a discharge flow passage uses a filter having a less water splashing phenomenon and a less pressure loss, a humidification effect can be increased.

Third, as a water tank humidification medium installed at a humidification flow passage inlet uses a filter of a material having a high moisture absorption power, the effect of a humidification performance can be increased.

Fourth, since water is sprayed by a waterwheel, a humidification filter absorbs the water, and the water is vaporized by the wind naturally to provide a humidification effect, a comfortable environment can be provided to a user.

The effects of the present invention are not limited to the above; other effects that are not described herein will be clearly understood by the persons skilled in the art from the following claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A humidification and air cleaning apparatus comprising:
an intake flow passage to receive external air;
a discharge flow passage to discharge internal air;
an air blower to move air from the intake flow passage to the discharge flow passage;
a discharge humidification medium disposed at the discharge flow passage to humidify air;
a water tank humidification medium disposed between the air blower and the discharge humidification medium to humidify air; and
a nozzle to spray water between the water tank humidification medium and the discharge humidification medium.

2. The humidification and air cleaning apparatus of claim 1, wherein a material of the discharge humidification medium has less pressure loss than a material of the water tank humidification medium.

3. The humidification and air cleaning apparatus of claim 1, wherein a material of the water tank humidification medium has greater moisture absorption power than a material of the discharge humidification medium.

4. The humidification and air cleaning apparatus of claim 1, wherein the water tank humidification medium comprises a polyethylene terephthalate material.

5. The humidification and air cleaning apparatus of claim 1, wherein the water tank humidification medium comprises:
a pre-filter to prevent the sprayed water from splashing; and
a humidification filter to increase moisture in the moving air.

6. The humidification and air cleaning apparatus of claim 5, wherein the humidification filter comprises a double raschel structure where a connection member of is disposed therein and a hexagonal mesh structure surrounds both sides of the connection member.

7. The humidification and air cleaning apparatus of claim 6, wherein the connection member and the hexagonal mesh structure are each formed of polyethylene terephthalate.

8. The humidification and air cleaning apparatus of claim 7, wherein the pre-filter and the hexagonal mesh structure each comprise a plurality of holes, the holes of the pre-filter being smaller than the holes of the hexagonal mesh structure.

9. The humidification and air cleaning apparatus of claim 5, wherein the pre-filter and the humidification filter are coupled together by a melting process.

10. The humidification and air cleaning apparatus of claim 1, wherein the water tank humidification medium has a hopper configuration, whereby the cross-sectional area of a lower section thereof is less than the cross-sectional area of an upper section thereof.

11. The humidification and air cleaning apparatus of claim 10, further comprising a water tank humidification medium housing to support the water tank humidification medium, wherein the water tank humidification medium comprises a fixing part that is fixed to the water tank humidification medium housing.

12. The humidification and air cleaning apparatus of claim 1, wherein the discharge humidification medium is formed of polyurethane.

13. The humidification and air cleaning apparatus of claim 12, wherein the discharge humidification medium has a pore size of 20 to 25 pores per inch.

14. A humidification and air cleaning apparatus comprising:
an air cleaner to filter external air, the air cleaner comprising:
an intake flow passage to receive the external air; and
a filtering flow passage to filter the received external air;

an air washer to humidify the filtered air, the air washer comprising:
a humidification flow passage to supply moisture to the filtered air, the humidification flow passage comprising:
a water tank humidification medium to supply moisture to the filtered air at an inlet of the humidification flow passage;
a discharge humidification medium to supply moisture to air at an outlet of the humidification flow passage; and
a discharge flow passage to discharge the moistured air from the humidification flow passage.

15. The humidification and air cleaning apparatus of claim 14, further comprising a blower to move air from the filtering flow passage to the humidification flow passage.

16. The humidification and air cleaning apparatus of claim 14, wherein the air cleaner further comprises an air cleaner connection passage to receive filtered air from the filtering flow passage, and the air washer further comprises a humidification connection flow passage that is communicably coupled to the air cleaner connection passage.

17. The humidification and air cleaning apparatus of claim 14, further comprising a water tank to store water, wherein the humidification flow passage comprises a watering unit to wet the water tank humidification medium and the discharge humidification medium using the stored water.

* * * * *